Patented May 27, 1947

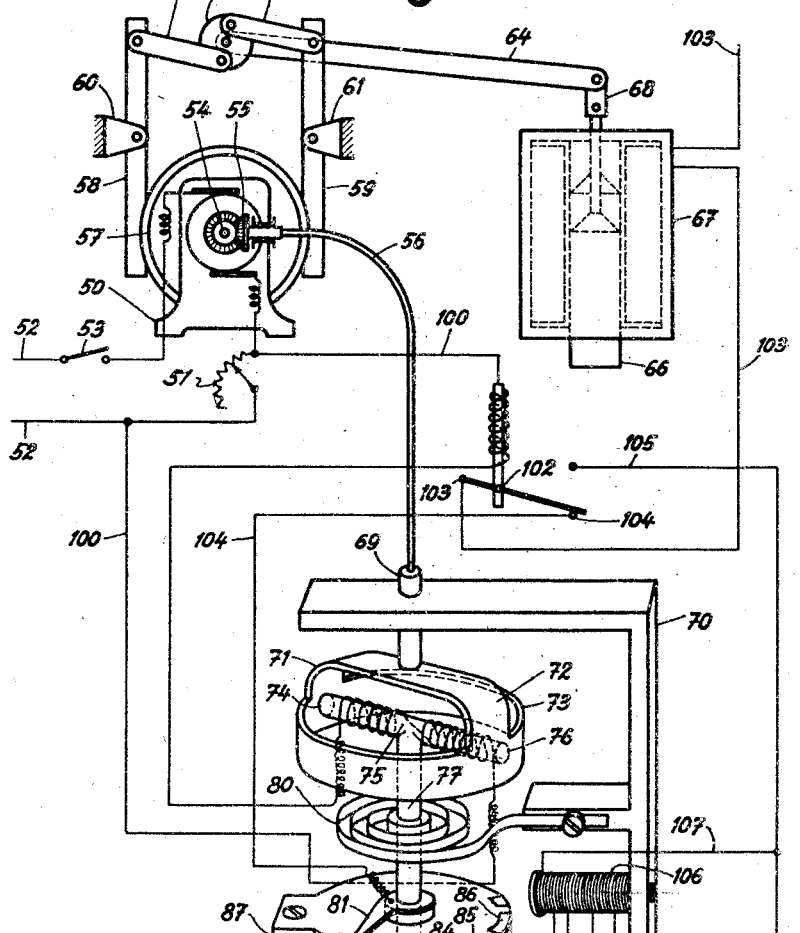

UNITED STATES PATENT OFFICE 2,421,187

BRAKING DEVICE REGULATED BY MOTOR SPEED AND LOAD

Ernest Alphonse Derungs, Le Locle, Switzerland

Application December 23, 1943, Serial No. 515,406
In Switzerland July 3, 1942

3 Claims. (Cl. 188—158)

Object of the present invention is a braking device. Up till now the braking of certain vehicles was very violent and this even more at the moment of the total stop than at the beginning of the braking process. This fact occurs for the reason that the braking force is constant while the kinetic energy to be absorbed by braking diminishes very rapidly in proportion as the speed of the vehicle decreases.

The effect of the braking force which, at the beginning, was tolerable owing to the great kinetic energy opposed to it, becomes unbearable at the end of the braking process for it provokes a sudden stop while exceeding the kinetic energy diminishing with the speed.

The braking device according to the invention remedies these inconveniences. It allows a reasonable proportion to be obtained between the energy to be absorbed and the braking force during the braking process.

The device according to the invention comprises a brake entering automatically into action when the energy supply to the movable body to be braked is interrupted. By preference, a shoe or a band brake may be used, put into action by a counterweight controlled by any means, for instance, by an electromagnet or a piston moved by a fluid under pressure. By these means the braking intensity can be adapted to the varying kinetic energy.

The accompanying drawings illustrate, by way of example, one embodiment of the object of the invention.

Fig. 1 is an upright projection of a shoe brake forming part of the device, and

Fig. 2 is a perspective view of an automatic regulating device for the braking intensity.

Though the represented device is particularly destined to work under alternating current, the electric circuits are illustrated by a single conductor in order to simplify the drawings.

In the latter, an electric motor 50 is fed through the conductors 52 when the switch 53 is closed; the shaft 54 of this motor drives by a bevel transmission gear 55 and a flexible shaft 56 the automatic device shown in Fig. 2.

Besides this, the shaft 54 drives the brake pulley 57 lying between the movable brake shoes 58 and 59 pivotally mounted on the bearings 60 and 61 and pressed against the brake pulley 57, when they are driven by the rods 62 and 63 on the disc 65, to which these rods are connected, being rotated in the clockwise direction by the rod 64. The latter is attached to the movable core 66 of an electromagnet 67 by means of the connection piece 68 so that the core 66 can move the rod 64 either in the one or in the other direction according as this core acts with its weight upon the rod 64 or as it is attracted by the excitation of the magnet 67.

The flexible shaft 56 is fixed to a sleeve 69 rotatably mounted on the frame 70. It is in rigid connection with the arms 71 and 72 of the ring 73 made of conducting metal. Inside this ring 73, and passing exactly through the axis of the same, is an electromagnet 74, 75, 76 which, at 75, is fixed to a shaft 77 journaled on the portions 78 and 79 of the frame 70. A spiral spring 80 is fastened, with the one end, to the shaft 77 and, with the other end, to the frame 70. It tends constantly to rotate the shaft 77 in the anticlockwise direction. The spring is tightened when the shaft 77 is in the position shown in the drawing.

A sliding contact member 81 fixed to the shaft 77 is displaceable along the contact segments 82, 83, 84, 85, 86 fastened to an insulating disc 87 attached to the frame 70, A toothed wheel 89 mounted on the shaft 77 engages a pinion 90 whose axle drives an escape wheel 91 cooperating with a lever 92 whose shaft carries an adjustable balance 93. Besides this, a non-represented unilateral clickwork is provided, permitting the wheel 89 to rotate in the one direction without driving this clickwork. From the conductor 52, a conductor 100 is branched off into which the circuit closing relay 102 and the electromagnet 74, 75, 76 are inserted. The conductor 103 supplies the electromagnet 67 with current either through the conductor 104 or the conductor 105 according to the position of the closing relay 102. The conductor 104 is connected to the sliding contact member 81 from which the current flows through one of the contact segments 82, 83, 84, 85 connected to different branches of the impedance 106 whose circuit is closed by the conductor 107.

The illustrated device works as follows:

The switch 53 being closed by a non-represented means, the current passes through the conductor 52, the motor 50 and the rheostat 51. The conductor 100 going out from the latter feeds the coil of the relay 102 and that of the electromagnet 74, 75, 76. The relay 102, when excited, closes the circuit 105 and the electromagnet 67 attracts the core 66 which moves the piece 68 and the rod 64 so that the disc 65 is rotated in the anticlockwise direction, thereby removing the shoes 58 and 59 from the brake pulley 57. At the same time as the motor 50 begins to run, its shaft 54 takes along the intermediate gear 55 and the flexible shaft 56 whereby the sleeve 69, the arms 71 and 72 and the conducting ring 73 are driven in synchronism to the motor 59.

By a well-known induction effect, the ring 73, on rotating, tends to take along the electromagnet 74, 75, 76 and this the more so the greater its speed is, and if the excitation of the electromagnet which depends on the voltage loss in the rheostat 51 has the intensity of the current absorbed by the motor 59.

From the aforesaid it may be seen that the more the speed of the motor and the power absorbed by the same increase, the more the moment, tending to remove the electromagnet 74, 75, 76 from its initial position, increases. Since this electromagnet 74, 75, 76 is fastened to the shaft 77 to which also one end of the spiral spring 80 is fixed whose other end is attached to the frame 70, the shaft 77 oscillates in the one direction when the moment of the electromagnet and of the ring exceeds that of the spring and, in the contrary way, it oscillates in the other direction.

The sliding contact member 81 can only establish circuits with the contact segments 82, 83, 84, 85 when the current passes through the conductor 104. When the oscillating electromagnet 74, 75, 76 is excited, the member 81 and the segments 82 to 85 do not, therefore, receive current.

When the shaft 77 is driven in the direction in which the ring 73 rotates, it is released by a non-represented clickwork from any connection with the retarding device controlled by the lever 92. On the other hand, when the shaft 77 is returned by the spring 80, the retarding device adjusts the duration of the return movement, that is, the time of passage of the sliding contact member along the segments 82, 83, 84, 85, 86.

From the aforesaid it follows that at the moment when the motor commences to run, the member 81 leaves the segment 86 and goes towards the segment 82, while describing an angle which is the greater, the greater, on the one side, the speed, and, on the other side, the output or input respectively of the motor 50. During this time, the electromagnet 67, excited through the circuit 105, releases the brake.

If the switch 53 is open, during the running of the motor, the sliding contact member 81 returns to the segment 86 as slowly as it is prescribed by the adjustment of the escapement 92. This return period corresponds to the braking period during which the electromagnet 67 is temporarily and partially excited by the circuit 104 into which the different branches of the impedance 106 are inserted. Therefore, the movable core 66 does not fall abruptly. The force which it exerts on the rod 64 is in proportion to the kinetic energy to be absorbed by the brake.

Indeed, the value of the impedance 106, that is, the degree of excitation of the magnet and, with it, of the braking effect, depends on the position of the member 81 at the moment of the stopping of the motor, and the progressive increase of the impedance, i. e. the progressive decrease of the braking effect depends on the retarded passage of the member 81 along the segments 82 to 85. The circuit 104 is interrupted when the member 81 arrives on the segment 86.

The device described is one in which the brake is operated by the core of an electromagnet. However, this core might be replaced by equivalent mechanical means without going beyond the scope of the invention. Besides this, in the case of a brake equipped with a piston under the effect of a fluid, the regulating device might be connected to the cylinder of this piston in such a way that it can operate in an analogous manner as that above described.

What I claim is:

1. In a device, a mover to be braked, a brake in operating relation with said mover, an operator in relation with said brake, arranged to put said brake automatically into action, an apparatus for automatically regulating the braking intensity of said brake, comprising, a rotatable part in driven connection with said mover, forming the one half of an induced current coupling, an oscillatingly rotatable means operative to adjust the effect of said operator upon said brake, forming the other half of said induced current coupling so as to be in driven relation with said rotatable part for rotation in one direction, a driver connected with said oscillatingly rotatable means to rotate the latter in the other direction for adjusting said operator's effect upon said brake, and a regulator coupled with said oscillatingly rotatable means on its rotation in said other direction to adjust the duration of the latter.

2. In a device, a mover to be braked, a brake in operating relation with said mover, an electrically controlled operator in relation with said brake, arranged to put said brake automatically into action, an interruptable electric control circuit for said operator, an impedance inserted into said control circuit, several contacts branched to different values of said impedance to be alternately inserted into said control circuit, an induced current coupling with its one half formed as a rotatable part in driven connection with said mover, and with its other half formed as an oscillatingly rotatable means arranged to be driven by induction effect between itself and said rotatable part for rotation in one direction, a driver connected with said oscillatingly rotatable means to rotate the latter in the other direction, a sliding contact fixed to said rotatable means to cooperate on rotation of said rotatable means in said other direction with said contacts one after another for adjusting said operator's effect upon said brake, and a regulator coupled with said oscillatingly rotatable means on its rotation in said other direction to adjust the duration of the latter.

3. In a driver, a mover to be braked, a brake in operating relation with said mover, an electrically controlled operator in relation with said brake, arranged to put said brake automatically into action, a first interruptable electric control circuit for said operator, an impedance inserted into said first control circuit, several contacts branched to different values of said impedance to be alternately inserted into said first control circuit, a second electric circuit comprising a means arranged to close said first electric control circuit on voltage change in said second electric circuit, an induced current coupling with its one half formed as a rotatable part in driven connection with said mover, and with its other half formed as an oscillatingly rotatable means, one of said halves comprising a winding inserted into said second circuit to cooperate by induction effect with the other half to rotate said oscillatingly rotatable means in one direction, a spring fixed to said oscillatingly rotatable means to rotate the latter after interruption of said second circuit in the other direction, a sliding contact fixed to said rotatable means to cooperate on rotation of said rotatable means in said other direction with said contacts one after another for adjusting said operator's effect upon said brake, and a regulator coupled with said oscillatingly rotatable means on its rotation in said other direction to adjust the duration of the latter.

ERNEST ALPHONSE DERUNGS.

REFERENCES CITED

The following references are of record in the file of this patent:

UNITED STATES PATENTS

| Number | Name | Date |
|---|---|---|
| 1,931,564 | White et al. | Oct. 24, 1933 |
| 2,128,045 | Hanna | Aug. 23, 1938 |
| 1,626,920 | Coleman | May 3, 1927 |
| 2,266,014 | Erickson | Dec. 16, 1941 |
| 2,162,490 | Mikina | June 13, 1939 |